United States Patent
Terrill et al.

(10) Patent No.: US 8,331,354 B2
(45) Date of Patent: *Dec. 11, 2012

(54) METHOD AND APPARATUS FOR ALLOCATING APPLICATION SERVERS IN AN IMS

(75) Inventors: Stephen Terrill, Madrid (ES); Bo Åström, Stockholm (SE); Hubert Przybysz, Hägersten (SE); Anders Ryde, Saltsjöbaden (SE); Stefan Berg, Bonn (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1331 days.

This patent is subject to a terminal disclaimer.

(21) Appl. No.: 11/995,871

(22) PCT Filed: Aug. 15, 2005

(86) PCT No.: PCT/EP2005/054010

§ 371 (c)(1),
(2), (4) Date: Feb. 20, 2008

(87) PCT Pub. No.: WO2007/009499

PCT Pub. Date: Jan. 25, 2007

(65) Prior Publication Data

US 2008/0212569 A1 Sep. 4, 2008

Related U.S. Application Data

(60) Provisional application No. 60/700,683, filed on Jul. 19, 2005.

(51) Int. Cl.
*H04L 12/66* (2006.01)
*H04W 4/00* (2009.01)
*G06F 15/173* (2006.01)
*G06F 15/16* (2006.01)
*H04M 3/42* (2006.01)

(52) U.S. Cl. ........ 370/352; 370/353; 370/354; 370/355; 370/356; 379/201.12; 455/422.1; 455/433; 455/435.1; 455/435.2; 455/435.3; 709/204; 709/205; 709/206; 709/207; 709/217; 709/218; 709/219; 709/223; 709/226

(58) Field of Classification Search .......... 370/352–356; 379/201.12; 455/422.1, 433, 435.1, 435.2, 455/435.3; 709/204–207, 217–219, 223–229
See application file for complete search history.

(56) References Cited

U.S. PATENT DOCUMENTS
7,643,626 B2 * 1/2010 Haase et al. ............. 379/201.03
(Continued)

FOREIGN PATENT DOCUMENTS
WO WO 2004/008178 A2 1/2004
(Continued)

OTHER PUBLICATIONS

M. Garcia-Martin. "RFC 4083: Input 3rd-Generation Partnership Project (3GPP) Release 5 Requirements on the Session Initiation Protocol (SIP)". May 2005. <http://rsync.tools.ietf.org/html/rfc4083>.*

*Primary Examiner* — Asad Nawaz
*Assistant Examiner* — Kai Chang

(57) ABSTRACT

A method, application server, and Serving Call/Session Control Function (S-CSCF) for allocating a SIP Application Server to a subscriber in an IP Multimedia Subsystem. A Home Subscriber Server (HSS) identifies for the subscriber, a set of provisioned initial filter criteria, which contains at least one generic SIP Application Server identity. The HSS sends the filter criteria to an S-CSCF allocated to the subscriber. The S-CSCF resolves the generic SIP Application Server identity into a plurality of application server addresses, with one of the addresses being allocated to the subscriber for use in provisioning a service to the subscriber. The S-CSCF caches the address allocated to the subscriber for subsequent use.

10 Claims, 6 Drawing Sheets

U.S. PATENT DOCUMENTS

| | | | |
|---|---|---|---|
| 7,761,600 B2 * | 7/2010 | Terrill et al. | 709/245 |
| 2004/0122934 A1 * | 6/2004 | Westman et al. | 709/223 |
| 2005/0155036 A1 * | 7/2005 | Tiainen et al. | 719/310 |
| 2006/0023657 A1 * | 2/2006 | Woodson et al. | 370/328 |
| 2006/0153353 A1 * | 7/2006 | O'Neil | 379/211.02 |
| 2007/0159976 A1 * | 7/2007 | Dekeyzer et al. | 370/236 |

FOREIGN PATENT DOCUMENTS

| | | |
|---|---|---|
| WO | WO 2005/064883 A1 | 7/2005 |
| WO | WO 2005/064896 A | 7/2005 |
| WO | WO 2007/009498 A1 | 1/2007 |

* cited by examiner

METHOD AND APPARATUS FOR ALLOCATING APPLICATION SERVERS IN AN IMS

This application claims the benefit of U.S. Provisional Application No. 60/700,683, filed Jul. 19, 2005, the disclosure of which is fully incorporated herein by reference.

FIELD OF THE INVENTION

The present invention relates to a method and apparatus for allocating application servers in an IP Multimedia Subsystem.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalized, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's User Profile.

FIG. 2 illustrates the IMS Service Control (ISC) interface between an AS and an S-CSCF, as well as other interfaces within the IMS. Although the AS in FIG. 2 is shown as having only a single interface to an S-CSCF, it will be appreciated that in practice the ISC interface will extend across a communication network to which many (or all) of the CSCF servers of a given operator's network are connected, allowing an AS to communicate with all of these CSCFs. [Other entities illustrated in FIG. 1 will be well known to those of skill in the art.]

A further interface (Ut) exists between the AS and the user terminal (TS23.002) although this is not shown in the Figure. The Ut interface enables the user to manage information related to his or her services, e.g. creation and assignment of Public Service Identities, management of authorization policies that are used for example by "presence" services, conference policy management, etc.

In the IMS as defined in 3GPP, whilst subscribers are statically allocated to an HSS, it is the ASs that provide specific value in the case of services provided by the network. A reading of the 3GPP specification in Releases 5 and 6 suggests that subscribers are allocated to particular SIP ASs in a fixed manner. The basic concept is that a subscriber is provisioned to be supported by a specific SIP AS application server for a given service or services. In order to enable the allocated S-CSCF to reach the allocated AS over the ISC interface, the filter criteria (contained within the IFC sent to the S-CSCF from the HSS) for that subscriber for that service contains either a fully qualified domain name (FQDN) or IP address as the destination address (encoded as a SIP-URI). This implies, for example, that when the S-CSCF identifies that a particular INVITE should be routed to an AS, the S-CSCF is provided with the address of the specific AS over via the Cx interface. In order to identify the correct AS for other interfaces, e.g. such as the Ut interface between the user terminals and the SIP-ASs, routing proxies are provisioned with the address of the AS for the particular user. Where subscribers are allocated to specific ASs, then either the terminal is configured with the address of the AS for that interface and service, or the terminal sends the request to an entity that knows how to retrieve the address of the AS for that subscriber. A "front end" could do this and, in such a case, the routing functionality would be configured into the front end.

SUMMARY OF THE INVENTION

As will be clear from the above discussion, the existing proposal for the allocation of ASs to subscribers requires the provisioning of a user to a specific SIP application server for a given service or set of services. This requires a high level of availability and persistent storage of data on the ASs as, if a single AS becomes temporarily unavailable or does not retain the appropriate information, the provisioned service(s) will be unavailable to the subscribers to whom the AS is allocated. Adopting this approach may require the building-in of redundancy to each AS.

According to a first aspect of the present invention there is provided a method of allocating a Session Initiation Protocol Application Server to a subscriber within an IP Multimedia Subsystem, the method comprising:
 identifying at a Home Subscriber Server a set of provisioned initial filter criteria for said subscriber, said set of initial filter criteria containing at least one generic Session Initiation Protocol Application Server identity;
 sending said set of initial filter criteria from the Home Subscriber Server to a Serving Call/Session Control Function allocated to said subscriber;
 receiving said set of initial filter criteria at said Serving Call/Session Control Function and resolving said generic Session Initiation Protocol Application Server identity into a plurality of Application Server addresses;
 allocating one of said addresses to said subscriber for use in provisioning a service to said subscriber; and
 caching the allocated address at the Serving Call/Session Control Function for said subscriber for subsequent use.

Embodiments of the present invention introduce a considerable degree of flexibility into the process of allocating a SIP Application Server to a subscriber. In the event that a given SIP Application Server becomes unavailable or is unable to provide the desired service, the S-CSCF can simply allocate a new Application Server to the subscriber.

Preferably, said Session Initiation Protocol Application Server identity is a SIP-URI.

Preferably, said plurality of Application Server addresses are Fully Qualified Domain Names or IP addresses.

Preferably, said step of resolving said generic Session Initiation Protocol Application Server identity into a plurality of Application Server addresses comprises sending a request containing said generic Session Initiation Protocol Application Server identity to a Domain Name Server, the Domain Name Server responding by identifying a plurality of Application Server addresses corresponding to said generic Session Initiation Protocol Application Server identity, and sending to the Serving Call/Session Control Function said plurality of addresses.

In an embodiment of the invention, said step of allocating one of said addresses to said subscriber for use in provisioning a service to said subscriber comprises selecting an address based upon a prioritization of addresses provided by the Domain Name Server. Selection may be based upon a round-robin selection, weighted according to the priority.

Preferably, the method comprises, following the allocation of an Application Server address to a subscriber, caching at the Serving Call/Session Control Function the association between the subscriber and the address.

The method of the above first aspect of the invention is carried out at Session Initiation Protocol registration of the subscriber. The method may also be carried out when the subscriber is unregistered but is at the terminating end of a Session Initiation Protocol call.

In an embodiment of the first aspect of the invention the method comprises sending, from the application server corresponding to the allocated address to a central store, one or more interface addresses of the application server. Preferably, said central store is said Home Subscriber Server. This is done after receipt of a SIP request for a user that the application server does not currently have knowledge of.

According to a second aspect of the present invention there is provided a Serving Call/Session Control Function node for use within an IP Multimedia Subsystem, the node comprising:
 an input coupled to a Home Subscriber Server for receiving therefrom a set of initial filter criteria for a subscriber, said set of initial filter criteria containing at least one generic Session Initiation Protocol Application Server identity;
 processing means for resolving said generic Session Initiation Protocol Application Server identity into a plurality of Application Server addresses, and for allocating one of said addresses to said subscriber for use in provisioning a service to said subscriber; and
 a memory for caching the allocated address in association with the subscriber.

According to a third aspect of the present invention there is provided a method of routing Session Initiation Protocol messages between a Serving Call/Session Control Function and an Application Server within an IP Multimedia Subsystem, the method comprising:
 identifying at said Serving Call/Session Control Function an address of said Application Server to be allocated to a given subscriber;
 caching an association between said address and said subscriber; and
 using said association to forward future Session Initiation Protocol messages sent to or from said subscriber.

According to a fourth aspect of the present invention there is provided a method of identifying a SIP application server allocated to a subscriber in an IP multimedia subsystem, the method comprising:
 upon allocation of a SIP application server to a subscriber, sending from the application server to a central store, one or more interface addresses of the application server or of another application server;
 storing the received address(es) at the central store in association with the subscriber identity;
 subsequently receiving a request from a subscriber or another network entity, at an application server of the IP multimedia subsystem, and in response sending a query to said central store;
 upon receipt of said query at the central store, identifying an application server address (or addresses) allocated to the subscriber, and sending the identified address(es) to the querying application server.

The term "application server" as used here encompasses the conventional SIP application server as well as other servers that have a SIP interface.

Preferably, said central store is the Home Subscriber Server, the Sh interface being used to transfer said interface address(es) to the Home Subscriber Server. Protocols such as Lightweight Directory Access Protocol (LDAP) and Structured Query Language may be used to transfer the address(es) to the other central stores.

It will be appreciated that the application server that receives the request may or may not be the allocated application server. In the event that it is not the allocated application server, the request is forwarded to the allocated application server using an identified address.

The request may be received at the application server by a front end distributor, e.g. a front end of an XDMS.

The request may be sent to the application server from a subscriber terminal over the Ut interface.

The first and fourth aspects of the present invention are usefully employed in combination, in which case the step of sending from the application server to a central store, one or more interface addresses of the application server, is carried out following the sending of a SIP "method", e.g. a SIP request or register message, from the Serving Call/Session Control Function to the application server for a subscriber that the application server currently does not contain knowledge of.

According to a fifth aspect of the invention there is provided an application server for use in an IP multimedia subsystem, the application server comprising:
- an input for receiving a SIP method from a Serving Call/Session Control Function for a subscriber, identifying the application server as an allocated server for the subscriber; and
- sending its interface address(es) or an interface address or addresses for another application server, to a central store for storage in association with the subscriber's identity.

According to a sixth aspect of the invention there is provided an application server for use in an IP multimedia subsystem, the application server comprising:
- an input for receiving a request relating to a subscriber; sending a query to a central store, the query identifying the subscriber;
- receiving a response from the central store containing an address of an application server already allocated to the subscriber; and
- if the allocated application server is not the application receiving the request, forwarding the request to the allocated server's address.

DETAILED DESCRIPTION OF CERTAIN EMBODIMENTS

Figure 1:
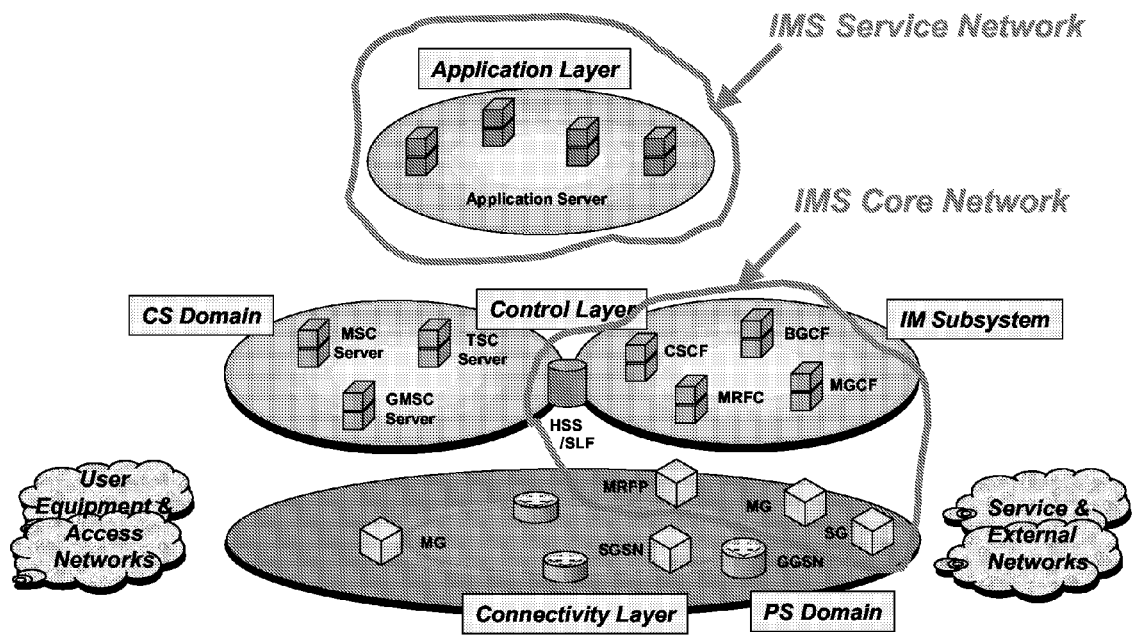
FIG. 1 illustrates schematically the integration of an IP Multimedia Subsystem into a 3G mobile communications system.
Figure 2:
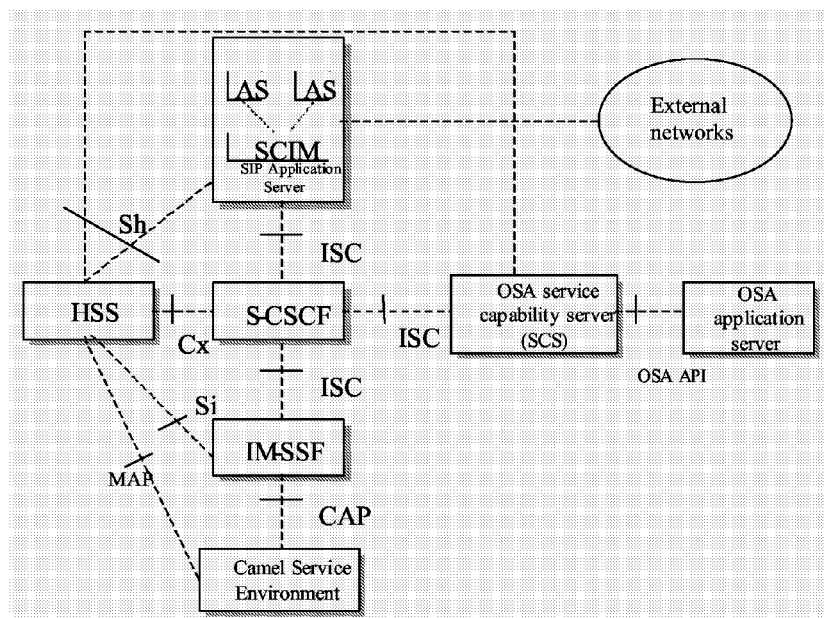
FIG. 2 illustrates schematically certain entities of the IP Multimedia Subsystem including an Application Server and a Serving Call/State Control Function.

The 3GPP Technical Standards referenced above describe the use of initial filter criteria (IFC), which are stored in the HSS, and which are sent to a Serving Call/Session Control Function (S-CSCF) node either upon either registration of a subscriber or when a terminating call is made to an unregistered subscribers. Conventionally, an IFC for a subscriber contains a specific SIP Application Server (AS) address, e.g. as a Fully Qualified Domain Name (FQDN). This identifies the AS that is allocated to that subscriber for a given service. [It is possible for an IFC to contain two or more AS addresses corresponding to respective IMS services.] If the AS address in the IFC is a SIP-URL, a DNS is used to resolve the SIP-URL to an IP address. The S-CSCF may cache the association between the specific SIP-AS address and the IP address for reasons of efficiency. This caching is typically in the DNS client (within the S-CSCF) and is cached on a per-node basis not on a per user basis.

It is proposed here to replace the specific Application Server address with a generic AS identity, e.g. SIP-AS.operator.com. This identifies a predefined group of ASs, all of which are capable of providing a given IMS service. In particular, the initial filter criteria (IFC), which is stored in the HSS, is provisioned with a generic name of an application server (e.g. SIP-AS.operator.com). At registration of a subscriber (or upon call termination for an unregistered subscriber), the IFC is downloaded to the S-CSCF across the Cx interface in accordance with the procedures described in 3GPP TS 23.228; 3GPP TS 29.228 and 3GPP TS 29.229. The generic identity of the SIP-AS is resolved to either a specific name (e.g. SIP-AS1.operator.com) which is further resolved to an IP address, or the generic identity is resolved directly to a number of IP addresses. Existing DNS methods are used for the resolution process. [In the case where the generic identity is resolved to a specific name which is further resolved to an IP address, two round trips between the S-CSCF and the DNS are required.] The IFC triggers the provision of a third party registration message (i.e. a SIP REGISTER message) by the S-CSCF to the selected SIP-AS. The S-CSCF remembers the association between the subscriber and the selected AS address and forwards all subsequent messages for that set of filters to the specific SIP-AS address.

To facilitate this process, the DNS is provisioned with a generic domain name that can be resolved to a number of fully qualified domain names or IP addresses. The generic domain name (e.g. SIP-AS.operator.com, corresponding to a specific IMS service) can represent a large number of application servers. The fully qualified domain name or IP address represents a specific application server (e.g. SIP-AS32.operator.com in the case of a FQDN). In order to allow user requests to be received over an interface which does not involve the S-CSCF in the flexible SIP-AS allocation approach described here, it is advantageous to allow an allocated SIP-AS to cache its contact address(es) at a central store, typically the HSS, in association with a subscriber's profile. This allows a later request, received over such an interface, to be forwarded to the allocated SIP-AS.

Figure 3:
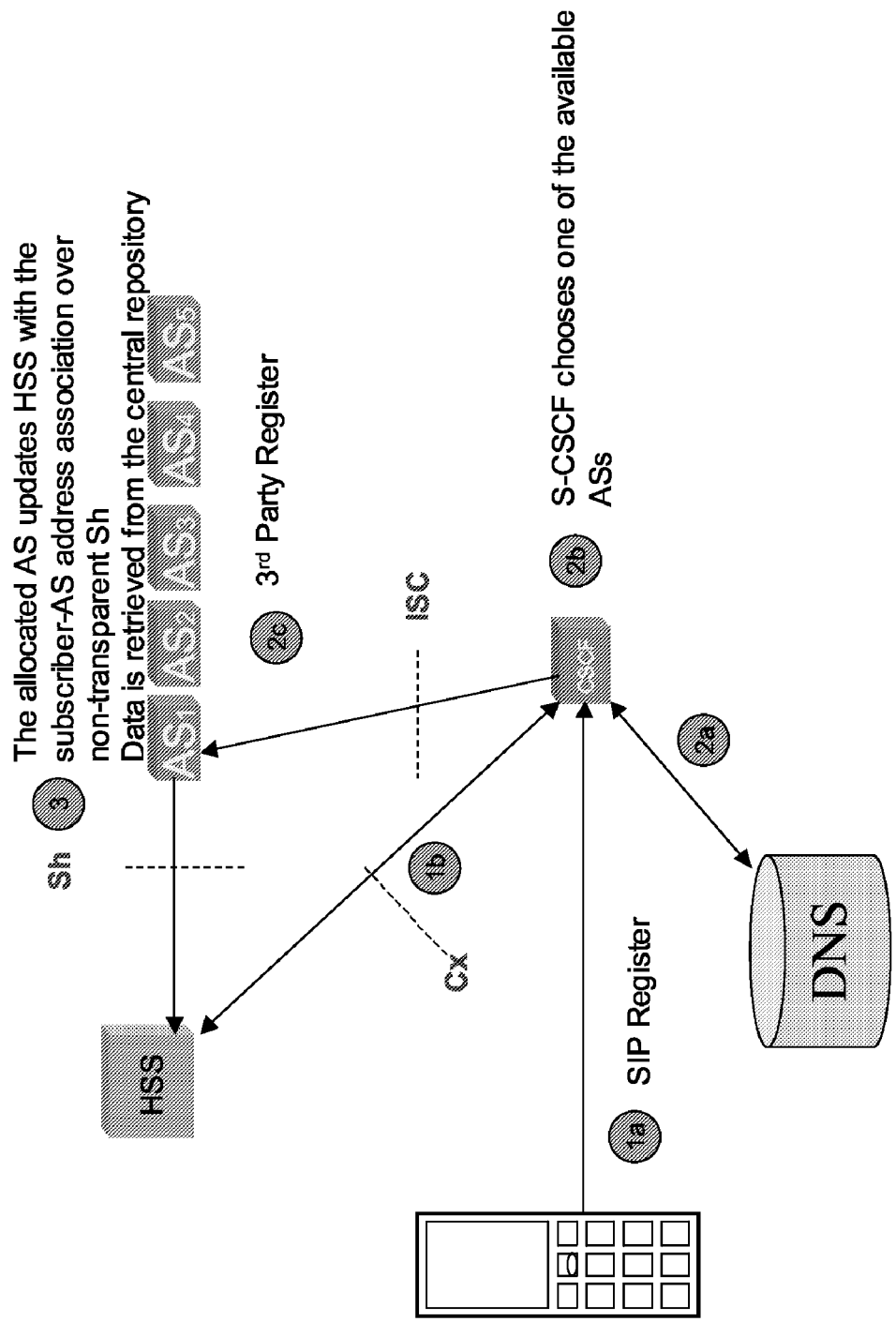
FIG. 3 illustrates schematically a process for allocating a SIP-AS to a subscriber during IMS registration.

With reference to FIG. 3, the SIP-AS allocation procedure will now be described in the context of a SIP registration for a particular subscriber. The steps of this procedure are as follows, with the step numbering corresponding to the numbering used in the Figure:

1a. The subscriber terminal initiates a REGISTRATION process by sending the SIP REGISTER message to the S-CSCF (via a P-CSCF).

1b. During the registration process, a service profile for the subscriber is downloaded to the S-CSCF from the HSS. This service profile contains the initial filter criteria including a generic application server identity.

2a. After completing the registration process, the S-CSCF learns from the IFC that it should send a third party REGISTRATION request to an application server. The S-CSCF must first however request the IP addresses from a DNS server by sending to it the generic identity. The DNS server responds back with a number of IP addresses corresponding to respective available ASs. The addresses are accompanied by respective priority weightings.

2b. The S-CSCF selects one of the returned IP addresses to forward the REGISTER message to. Selection is based upon a round-robin selection, weighted according to the priority allocated by the DNS. The S-CSCF caches a mapping between the subscriber and the selected AS IP address.

2c. A third party registration message is sent to the selected AS by the S-CSCF.

3. Upon receiving the third party registration, the AS performs the following actions:

It stores its own address in the HSS. This address may actually comprise an array of addresses for different interfaces, e.g. there may be a different address for the reception of SIP messages, HTTP traffic, etc. [The address (or one of the addresses) may be the SIP-AS address provided to the S-CSCF during the identity resolution step, although this need not be the case.]

It retrieves the required application specific subscriber data from the HSS.

The AS indicates to the HSS that it wishes to be informed of subsequent changes to the subscriber data.

In the short term, the SIP-AS may store its address in the HSS using "transparent data" over the Sh interface. In the long term, the SIP-AS address may be added to the non-transparent data in the HSS.

It is noted that, whilst in this example the HSS is the central repository for the AS address (and subscriber data), some other central repository may be used instead. This could be a database coupled (directly) to a set of ASs that implement an IMS service or which is generic for all ASs in an operator's/service provider's domain.

Upon completion of this process, a SIP-AS has been selected for the subscriber. The SIP-AS has retrieved a copy of the subscriber data from the HSS, and the S-CSCF has cached the address of the SIP-AS allocated for that user. The SIP-AS has also stored its addresses at the HSS in association with the subscriber's identity. During de-registration, the SIP-AS removes the stored AS address from the HSS.

Figure 4:
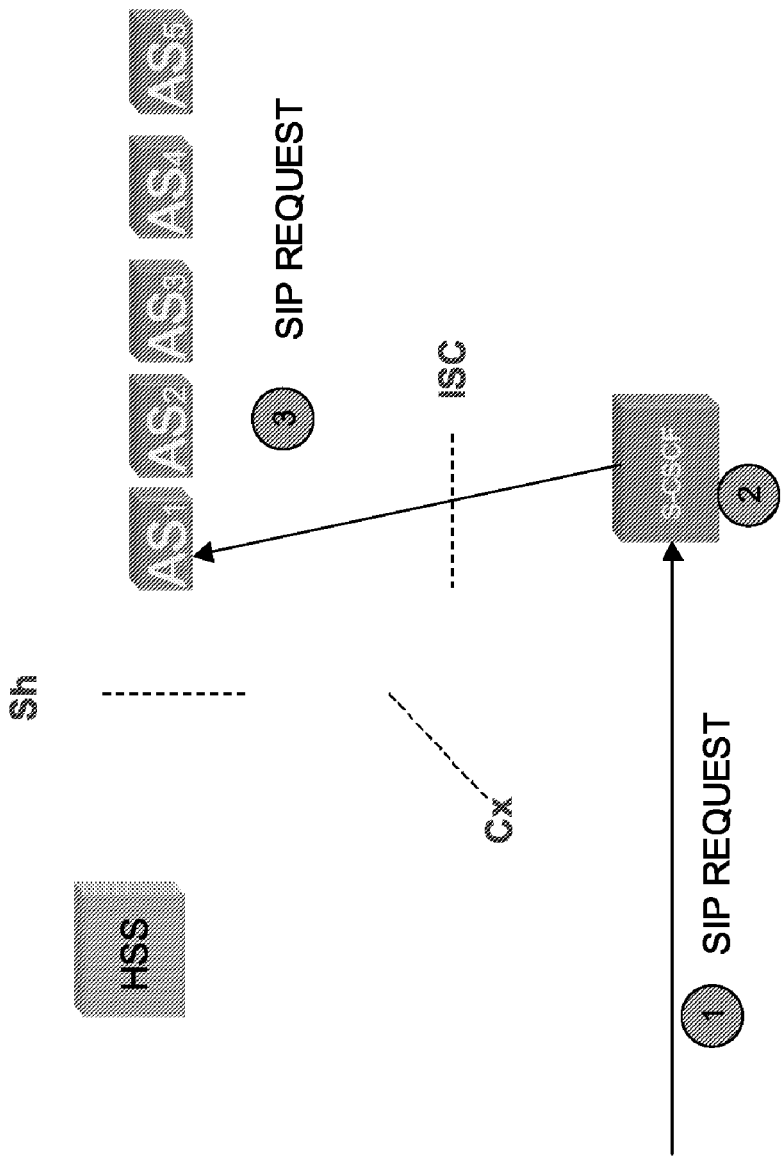
FIG. 4 illustrates schematically a process for handling an originating or terminating call request for a registered subscriber.

With reference now to FIG. 4, a procedure for handling originating or terminating calls for an already registered subscriber will be described. The flow for originating and terminating calls is as follows:

1. A SIP request for the subscriber is received by the S-CSCF.
2. The S-CSCF analyses the SIP request. The S-CSCF identifies the AS IP address previously cached for this subscriber.
3. The SIP request is sent to the SIP-AS. The SIP-AS has a copy of the application specific data for the subscriber downloaded during the previous registration process, and proceeds to process the SIP request.

Figure 5:
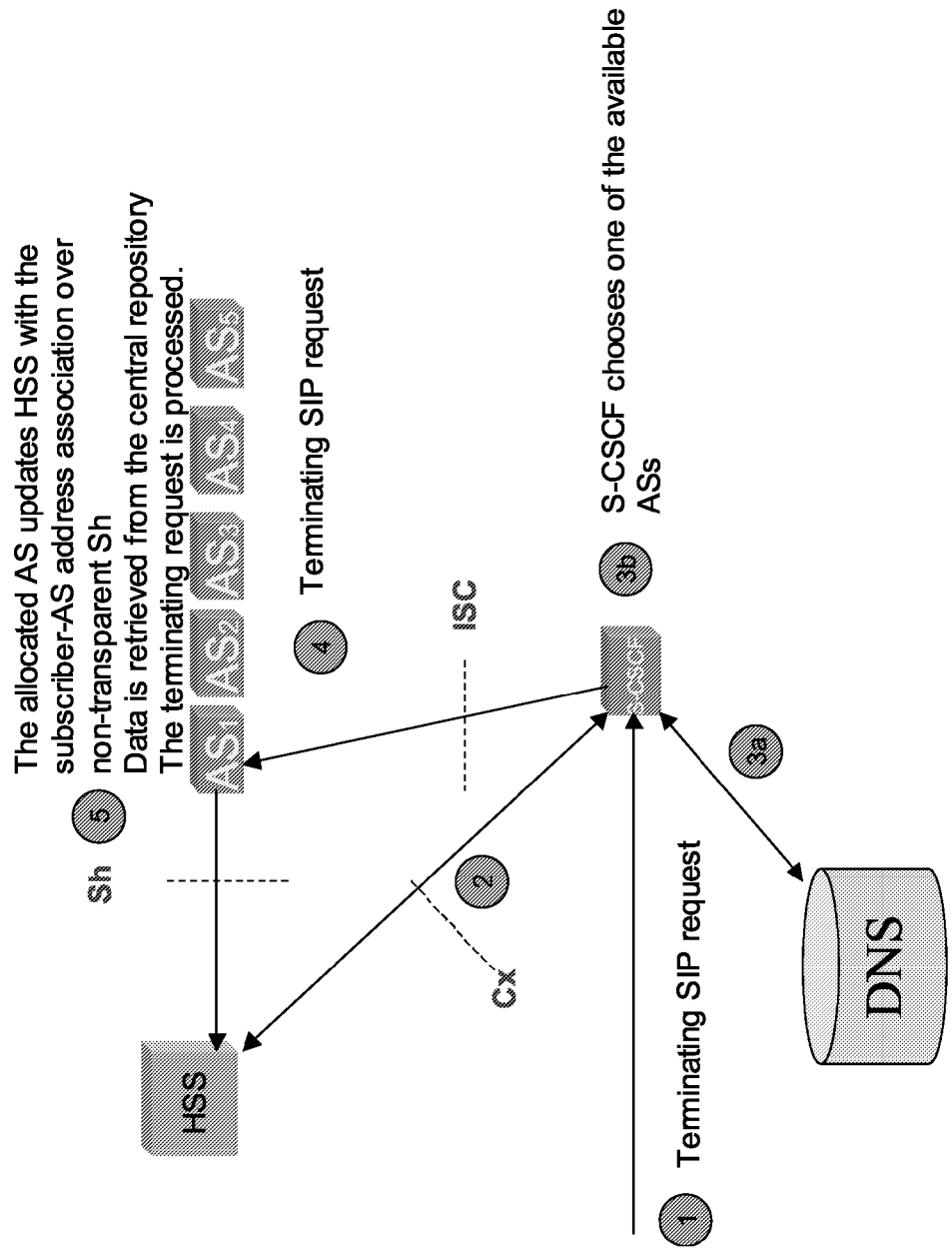
FIG. 5 illustrates schematically a process for handling a terminating call request for an unregistered subscriber.

With reference now to FIG. 5, a procedure for handling terminating calls for an unregistered subscriber will be described. As the subscriber is as yet unregistered, the S-CSCF does not have a cached SIP-AS IP address for this subscriber, and nor does the SIP-AS have the application specific subscriber data from the HSS. The process flow is as follows:

1. The S-CSCF receives a terminating SIP request.
2. The S-CSCF downloads the service profile from the HSS. This contains the initial filter criteria including a generic identity for the SIP-AS.

3a. The S-CSCF analyses the SIP request. If one of the IFCs is matched, the S-CSCF understands that it should send the terminating SIP request to an application server. The application server identity contained in the IFC is a generic name. The S-CSCF therefore requests the IP address from a DNS server. The DNS server responds back with a number of IP addresses.

3b. The S-CSCF selects one of the returned IP addresses to forward the REGISTER message to. The S-CSCF caches a mapping between the subscriber and the selected AS IP address.

4. The terminating SIP request is forwarded to the selected SIP-AS.

5. Upon receiving the terminating SIP request, the AS performs the following actions:

It stores its own address(es) for the user in the HSS.

It retrieves the required application specific subscriber data from the HSS.

The AS indicates to the HSS that it wishes to be informed of subsequent changes to the subscriber data.

During de-registration, the SIP-AS removes the stored AS address from the HSS. Optionally, the SIP-AS and the S-CSCF may have a timer which indicates that the data could be retained for a certain period of time after de-registration. In this case, the SIP-AS will remove the stored AS address at the expiration of the timer.

It is noted that, in some cases, e.g. where the SIP AS forwards a request (received from the S-CSCF) to another SIP AS, the addresses that are stored in the HSS by the first mentioned AS may be addresses for the other AS. This may occur when the AS has front end distribution functionality, or when there has been no response from originally selected AS, and a new selection has been made. It may also occur when there is a mismatch between the address stored by an S-CSCF and the AS serving the user. In this case, the AS that initially receives the request should check if the subscriber is allocated to another AS by looking up the user-AS association in HSS. If this exists, the request should be forwarded to the correct AS. If the user isn't allocated to an AS (no user-AS association in HSS), the AS should write its address in HSS. This allows traffic from the FE to be routed to the correct AS.

Following registration of a subscriber to the IMS, it is possible for a subscriber to initiate some action, for example a change to data and features of a particular IMS service, by sending a request to an AS over the Ut interface. The functional entity that handles Ut traffic is referred to as an XDMS, an XML Document Management Server (XDMS) which is typically co-located with a particular AS. The address of that AS might be prestored at the terminal as a default address for the Ut interface. In a manner similar to the way in which ISC traffic is handled, where the S-CSCF routes signalling to the AS serving a particular user, a front end functional entity is required to ensure that Ut traffic is routed to the XDMS co-located with the AS serving the user.

A request from a subscriber terminal sent over the Ut interface is received by an XDMS front end. The XDMS front end looks up the address of the AS which relates to the XDMS functionality, over the Sh interface (Note: This is one of the AS address that was stored in the procedures described above). In the event that no SIP-AS address is stored, the front end will itself select a SIP-AS and forward the request to that SIP-AS. The SIP-AS to which the request is forwarded will then store its address in the HSS, retrieve the subscriber's data from the HSS (or other central storage location) and proceed to process the request.

With reference to FIG. 5, a generic process for the handling of requests from other interfaces (including the Ut interface), when an AS has already been allocated to a subscriber, will now be described.

1. A request is received over the interface from a subscriber terminal. The request is terminated on a "Front end distributor" for the service represented by that front end.
2. The FE-DIST requests the AS address for the application from the HSS (or other central location).
3. The AS address is returned to the FE-DIST.
4. The request is forwarded by the FE-DIST to the XDMS.

Figure 6:
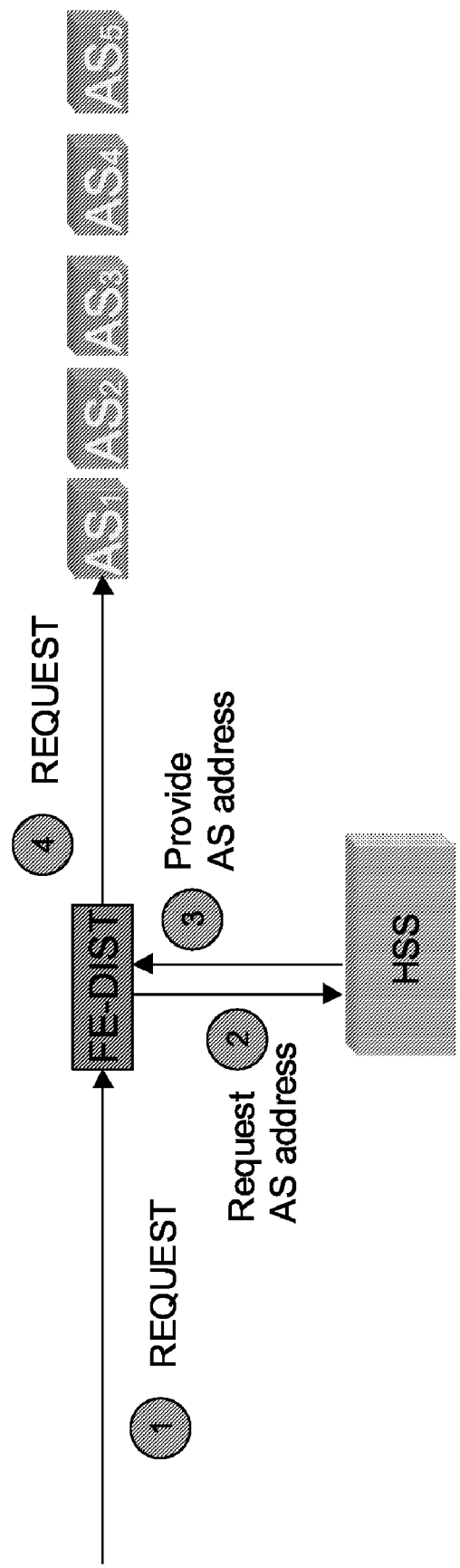
FIG. 6 illustrates schematically a process for handling a request received from a subscriber over a non-ISC interface where the subscriber is registered with the IMS.
Figure 7:
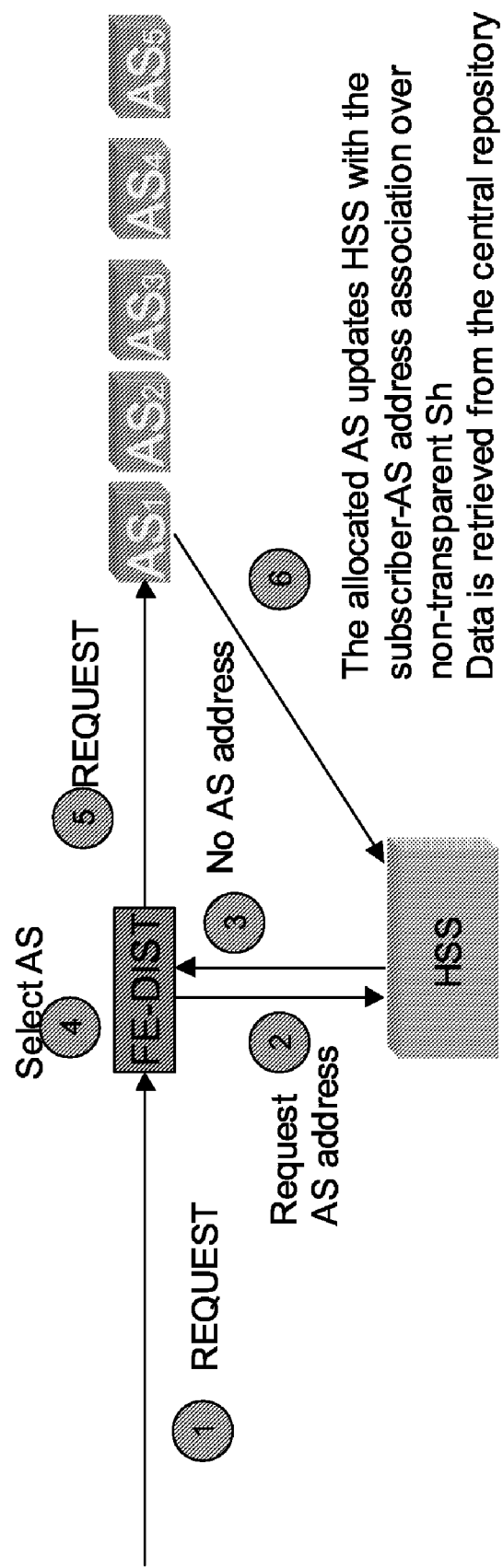
FIG. 7 illustrates schematically a process for handling a request received from a subscriber over a non-ISC interface where the subscriber is not registered with the IMS.

With reference to FIG. 6, a generic process for the handling of requests from other interfaces (including the Ut interface), when an AS has not already been allocated to a subscriber, will now be described. P 1. A request is received from the subscriber terminal over the particular interface. The request is terminated on a "Front end distributor" for the service represented by that front end.

2. The FE-DIST requests the AS address for the service from the HSS.
3. An indication that no AS has been allocated is returned to the FE-DIST.
4. The FE-DIST selects an AS (it may use other databases to obtain the names of valid ASs).
5. The request is forwarded to the selected AS.
6. The selected AS performs the following:

> The SIP-AS may store its name in the HSS. (Note: This may not be required if the transaction is to occur only once and it is not expected that there will be subsequent requests.
>
> It reads the subscriber data from the HSS.
>
> It processes the request.
>
> In the event that a SIP request is subsequently received at the S-CSCF, this may be dealt with by the S-CSCF selecting a new SIP-AS using the generic AS identity according to the approach described above. The HSS is informed of the selection, and in turn informs the previously allocated AS that it is no longer allocated and that it can release stored data and forget about the user (as a result of the AS having "subscribed" to changes in the data element at the HSS.

It will be appreciated by the person of skill in the art that various modifications may be made to the above described embodiments without departing from the scope of the present invention.

The invention claimed is:

1. A method of allocating a Session Initiation Protocol (SIP) Application Server to a subscriber within an IP Multimedia Subsystem, the method comprising the steps of:
    identifying at a Home Subscriber Server (HSS) a set of provisioned initial filter criteria for said subscriber, said set of initial filter criteria containing at least one generic SIP Application Server identity;
    sending said set of initial filter criteria from the HSS to a Serving Call/Session Control Function (S-CSCF) allocated to said subscriber;
    receiving said set of initial filter criteria at the S-CSCF and resolving the generic SIP Application Server identity by the S-CSCF into a plurality of Application Server addresses;
    receiving a SIP request associated with the subscriber at the S-CSCF, the SIP request including a subscriber identity;
    allocating by the S-CSCF, one of said addresses to said subscriber for use in provisioning a service to said subscriber;
    caching the allocated address at the S-CSCF for said subscriber for subsequent use;
    sending a SIP message from the S-CSCF to the application server at said allocated address, the SIP message including the subscriber identity; and
    upon receipt of said SIP message at the application server, dynamically allocating the subscriber to the application server and sending the address of the application server and the subscriber identity from the application server to the HSS over an Sh interface for storage as non-transparent data.

2. The method according to claim 1, wherein said SIP Application Server identity is a SIP-URI.

3. The method according to claim 1, wherein said plurality of Application Server addresses are Fully Qualified Domain Names or IP addresses.

4. The method according to claim 1, wherein said step of resolving said generic SIP Application Server identity into a plurality of Application Server addresses comprises sending a request containing said generic SIP Application Server identity from the S-CSCF to a Domain Name Server, the Domain Name Server responding by identifying a plurality of Application Server addresses corresponding to said generic SIP Application Server identity, and sending to the S-CSCF said plurality of addresses.

5. The method according to claim 1, wherein the method is carried out at SIP registration of the subscriber.

6. The method according to claim 1, wherein the method is carried out when the subscriber is unregistered but is at the terminating end of a SIP call.

7. A Serving Call/Session Control Function (S-CSCF) node for use within an IP Multimedia Subsystem, the node comprising:
    a first input for receiving from a Home Subscriber Server, a set of initial filter criteria for a subscriber, said set of initial filter criteria containing at least one generic (SIP) Application Server identity;
    a second input for receiving a SIP request associated with the subscriber at the S-CSCF, the SIP request including a subscriber identity;
    a processor configured to resolve the generic SIP Application Server identity into a plurality of Application Server addresses, and to allocate one of said addresses to said subscriber for use in provisioning a service to said subscriber;
    a memory for caching the allocated address in association with the subscriber for subsequent use; and
    an output for subsequently sending a SIP message from the S-CSCF to the application server at said allocated address, the SIP message including the subscriber identity.

8. A method of routing Session Initiation Protocol (SIP) messages between a Serving Call/Session Control Function (S-CSCF) and an Application Server within an IP Multimedia Subsystem, the method comprising the steps of:
    receiving at the S-CSCF, a SIP message from a Home Subscriber Server;
    identifying from a generic SIP Application Server identity included in the SIP message, an address of said Application Server
    receiving at the S-CSCF, a SIP request associated with the given subscriber, the SIP request including a subscriber identity for the given subscriber;
    allocating by the S-CSCF, the address of the Application Server to the given subscriber;
    caching by the S-CSCF, an association between the given subscriber and the address of the Application Server; and using said association to forward to the Application Server, the SIP request and the subscriber identity for the given subscriber and to forward future SIP messages sent between the Application Server and the given subscriber.

9. A method of identifying a Session Initiation Protocol (SIP) application server allocated to a subscriber in an IP multimedia subsystem, the method comprising the steps of:

upon allocation of a SIP application server to a subscriber, sending from the SIP application server to a Home Subscriber Server (HSS), at least one interface address of the SIP application server and a subscriber identity for the subscriber;

at the HSS, storing the received at least one interface address and associating the at least one interface address with the subscriber identity for the subscriber;

subsequently receiving at an application server of the IP multimedia subsystem, a request from a subscriber;

in response to the subscriber request, sending a query from the application server of the IP multimedia subsystem to the HSS;

upon receipt of said query at the HSS, identifying the at least one interface address for the SIP application server allocated to the subscriber; and sending the identified at least one interface address for the SIP application server from the HSS to the querying application server.

10. The method according to claim 9, wherein, if the application server receiving said request is not the allocated SIP application server, the request is forwarded to the allocated SIP application server using an identified address, and, if the subscriber is not allocated to an application server, the receiving SIP application server sends its address to the HSS.

* * * * *

UNITED STATES PATENT AND TRADEMARK OFFICE
CERTIFICATE OF CORRECTION

PATENT NO. : 8,331,354 B2
APPLICATION NO. : 11/995871
DATED : December 11, 2012
INVENTOR(S) : Terrill et al.

Page 1 of 1

It is certified that error appears in the above-identified patent and that said Letters Patent is hereby corrected as shown below:

In Column 10, Line 59, in Claim 8, delete "Server" and insert -- Server; --, therefor.

Signed and Sealed this
Second Day of April, 2013

Teresa Stanek Rea
*Acting Director of the United States Patent and Trademark Office*